(12) United States Patent
Dattathreya et al.

(10) Patent No.: US 10,664,609 B2
(45) Date of Patent: *May 26, 2020

(54) VERIFYING A REQUISITION OBJECT RECORD

(71) Applicant: International Business Machines Corporation, Armonk, NY (US)

(72) Inventors: Macam S. Dattathreya, Sterling Heights, MI (US); William P. Shaouy, Atlanta, GA (US); Russell T. White, Jr., Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 389 days.

This patent is subject to a terminal disclaimer.

(21) Appl. No.: 15/611,833

(22) Filed: Jun. 2, 2017

(65) Prior Publication Data

US 2017/0270312 A1 Sep. 21, 2017

Related U.S. Application Data

(63) Continuation of application No. 15/429,757, filed on Feb. 10, 2017, now Pat. No. 9,760,732, which is a
(Continued)

(51) Int. Cl.
*G06F 21/62* (2013.01)
*G06F 21/00* (2013.01)
(Continued)

(52) U.S. Cl.
CPC ...... *G06F 21/6218* (2013.01); *G06F 16/2365* (2019.01); *G06F 16/245* (2019.01);
(Continued)

(58) Field of Classification Search
CPC ...... G06F 21/00; G06F 21/10; G06F 21/6218; H04L 63/08; H04L 9/32; G06Q 10/087
See application file for complete search history.

(56) References Cited

U.S. PATENT DOCUMENTS 5,640,556 A 6/1997 Tamura
6,014,674 A * 1/2000 McCargar ............. G06F 16/284
(Continued)

OTHER PUBLICATIONS

J. Gao, L. Zhang and W. Jiang, "Procuring Requirements for ERP Software Based on Semantic Similarity," International Conference on Semantic Computing (ICSC 2007), Irvine, CA, 2007, pp. 61-70. (Year: 2007).*

(Continued)

*Primary Examiner* — Kari L Schmidt
(74) *Attorney, Agent, or Firm* — Schmeiser, Olsen & Watts, LLP; Mark Vallone

(57) ABSTRACT

A method and system. It is ascertained that a database stores the company profile record including the target attribute and a validity attribute associated with the target attribute. The validity attribute has a VALID or INVALID value respectively indicating that the target attribute in the company profile record has a valid or invalid value within the database. It is insured that the database stores a first and second user profile record, that a first user of a requisition transaction corresponds to the first user profile record, that the first user profile record includes the target attribute having a value identical to a value of the target attribute of a first company profile record associated with a first company represented by the first user, and that the validity attribute of the first company profile record has the VALID value. A requisition object record corresponding to the requisition transaction is verified.

15 Claims, 7 Drawing Sheets

Related U.S. Application Data continuation of application No. 13/608,470, filed on Sep. 10, 2012, now Pat. No. 9,619,666, which is a continuation of application No. 12/017,075, filed on Jan. 21, 2008, now Pat. No. 8,321,914.

(51) Int. Cl.

| | | |
|---|---|---|
| *H04L 9/32* | (2006.01) | |
| *G06F 21/10* | (2013.01) | |
| *H04L 29/06* | (2006.01) | |
| *G06F 16/245* | (2019.01) | |
| *G06F 16/23* | (2019.01) | |
| *G06Q 10/08* | (2012.01) | |

(52) U.S. Cl.
CPC .............. *G06F 21/00* (2013.01); *G06F 21/10* (2013.01); *G06Q 10/087* (2013.01); *H04L 9/32* (2013.01); *H04L 63/08* (2013.01)

(56) References Cited

U.S. PATENT DOCUMENTS

| | | | |
|---|---|---|---|
| 6,266,705 B1 | 7/2001 | Ullum et al. | |
| 6,374,252 B1 | 4/2002 | Althoff et al. | |
| 6,466,943 B1* | 10/2002 | Craig | G06F 16/284 |
| 6,629,098 B2* | 9/2003 | McGeorge, Jr. | G06F 17/2725 |
| 6,687,559 B2* | 2/2004 | Radjy | G06Q 10/06 700/106 |
| 6,697,865 B1 | 2/2004 | Howard et al. | |
| 6,795,821 B2* | 9/2004 | Yu | G06F 16/278 |
| 6,795,868 B1 | 9/2004 | Dingman et al. | |
| 6,850,900 B1 | 2/2005 | Hare et al. | |
| 6,853,997 B2 | 2/2005 | Wotring et al. | |
| 6,968,349 B2* | 11/2005 | Owen | G06F 11/1004 |
| 6,970,880 B2* | 11/2005 | Camarillo | G06F 16/258 |
| 7,051,071 B2 | 5/2006 | Stewart et al. | |
| 7,058,924 B2 | 6/2006 | Greenstein | |
| 7,099,836 B2* | 8/2006 | Cichanowicz | G06Q 10/063 705/26.8 |
| 7,127,475 B2* | 10/2006 | Gotz | G06F 16/289 |
| 7,185,317 B2* | 2/2007 | Fish | G06F 8/34 717/121 |
| 7,213,227 B2* | 5/2007 | Kompalli | G06F 8/20 717/108 |
| 7,225,197 B2* | 5/2007 | Lissar | G06F 16/288 707/700 |
| 7,225,425 B2* | 5/2007 | Kompalli | G06F 8/20 717/108 |
| 7,237,225 B2* | 6/2007 | Kompalli | G06F 8/20 717/108 |
| 7,246,319 B2 | 7/2007 | Alden et al. | |
| 7,249,157 B2 | 7/2007 | Stewart et al. | |
| 7,257,818 B2* | 8/2007 | Foerg | G06Q 30/06 719/310 |
| 7,257,820 B2* | 8/2007 | Fischer | G06F 16/84 719/316 |
| 7,577,953 B1 | 8/2009 | Verego et al. | |
| 7,725,483 B2* | 5/2010 | Poyourow | G06F 16/215 707/763 |
| 7,734,625 B2* | 6/2010 | Weinberg | G06F 16/2428 707/736 |
| 7,752,196 B2* | 7/2010 | Rogers | G06F 17/2705 707/716 |
| 7,933,902 B2* | 4/2011 | Crossgrove | G06F 11/0793 707/736 |
| 8,321,914 B2 | 11/2012 | Dattathreya et al. | |
| 9,619,666 B2 | 4/2017 | Dattathreya et al. | |
| 2002/0116203 A1* | 8/2002 | Cherry | G06Q 10/1053 705/321 |
| 2002/0198829 A1 | 12/2002 | Ludwig et al. | |
| 2005/0114369 A1 | 5/2005 | Gould et al. | |
| 2007/0203933 A1 | 8/2007 | Iversen et al. | |
| 2008/0052270 A1 | 2/2008 | Karlsson | |
| 2009/0187973 A1 | 7/2009 | Dattathreya et al. | |
| 2012/0330912 A1 | 12/2012 | Dattathreya et al. | |

OTHER PUBLICATIONS

Baron, John P., Michael J. Shaw, and Andrew D. Bailey Jr. "Web-based e-catalog systems in B2B procurement." Communications of the ACM 43.5 (2000): 93-100. (Year: 2000).*
Office Action (dated Apr. 12, 2011) for U.S. Appl. No. 12/017,075, filed Jan. 21, 2008; Art Unit 2439; Confirmation No. 5650.
Amendment filed Jun. 28, 2011 in response to Office Action (dated Apr. 12, 2011) for U.S. Appl. No. 12/017,075, filed Jan. 21, 2008; Art Unit 2439; Confirmation No. 5650.
Final Office Action (dated Sep. 16, 2011) for U.S. Appl. No. 12/017,075, filed Jan. 21, 2008; Art Unit 2439; Confirmation No. 5650.
Amendment and Request for Continued Examination filed Dec. 16, 2011 in response to Final Office Action (dated Sep. 16, 2011) for U.S. Appl. No. 12/017,075, filed Jan. 21, 2008; Art Unit 2439; Confirmation No. 5650.
Notice of Allowance (dated Jul. 18, 2012) for U.S. Appl. No. 12/017,075, filed Jan. 21, 2008; Art Unit 2439; Confirmation No. 5650.
Office Action (dated Apr. 8, 2015) for U.S. Appl. No. 13/608,470, filed Sep. 10, 2012.
Amendment (dated Jul. 16, 2015) for U.S. Appl. No. 13/608,470, filed Sep. 10, 2012.
Final Office Action (dated Oct. 20, 2015) for U.S. Appl. No. 13/608,470, filed Sep. 10, 2012.
Final Amendment (dated Dec. 21, 2015) for U.S. Appl. No. 13/608,470, filed Sep. 10, 2012.
Advisory Action (dated Jan. 25, 2016) for U.S. Appl. No. 13/608,470, filed Sep. 10, 2012.
RCE and PA (dated Feb. 23, 2016) for U.S. Appl. No. 13/608,470, filed Sep. 10, 2012.
Office Action (dated Jun. 17, 2016) for U.S. Appl. No. 13/608,470, filed Sep. 10, 2012.
Amendment (dated Sep. 19, 2016) for U.S. Appl. No. 13/608,470, filed Sep. 10, 2012.
Notice of Allowance (dated Nov. 30, 2016) for U.S. Appl. No. 13/608,470, filed Sep. 10, 2012.
Cook et al., "Distributed object middleware to support dependable information sharing between organisations." Dependable Systems and Networks, 2002. DSN 2002. Proceedings. International Conference on. IEEE, 2002.(pp. 249-258).
Hernandez et al., "Clio: A semi-automatic tool for schema mapping." ACM SIGMOD Record 30.2 (2001): pp. 607.
Notice of Allowance (dated Apr. 27, 2017) for U.S. Appl. No. 15/429,757, filed Feb. 10, 2017.
J. Al-Muhtadi, R. Campbell, A. Kapadia, M. D. Mickunas and Seung Yi, "Routing through the mist: privacy preserving communication in ubiquitous computing environments," Proceedings 22nd International Conference on Distributed Computing Systems, 2002, pp. 74-83.
D. Ismail, M. Etoh, Y. Kadobayashi and S. Yamaguchi, "A proposal and implementation of automatic detection/collection system for cross-site scripting vulnerability," 18th International Conference on Advanced Information Networking and Applications, 2004. AINA 2004., 2004, pp. 145-151 vol. 1.
Ronen, Amir, and Daniel Lehmann. "Nearly optimal multi attribute auctions." Proceedings of the 6th ACM conference on Electronic commerce. ACM, 2005. (pp. 279-285).

* cited by examiner

ONE EMBODIMENT OF USER PROFILE CLEANUP PROGRAM
700

UNIX® SHELL SCRIPT
"delete_invalid_profiles.sh"
710

```
711: set db_name = $argv[1]

712: set db_table = $argv[2]

713: set column_name = $argv[3]

714: set values = $argv[4]

715: delete * from "$db_name"."$db_table" where "$column_name" in ("$values")
```

COMMAND INVOKING UNIX SHELL SCRIPT
"delete_invalid_profiles.sh"
750

```
% delete_invalid_profiles.sh proc templloyee_profile chrg_co_cd 'ABC','DEF','GHI'
%
```

FIG. 6

VERIFYING A REQUISITION OBJECT RECORD

This application is a continuation application claiming priority to Ser. No. 15/429,757, filed Feb. 10, 2017, now U.S. Pat. No. 9,760,732, issued Sep. 12, 2017, which is a continuation to Ser. No. 13/608,470, filed Sep. 10, 2012, U.S. Pat. No. 9,619,666, issued Apr. 11, 2017, which is a continuation of Ser. No. 12/017,075, filed Jan. 21, 2008, U.S. Pat. No. 8,321,914, issued Nov. 27, 2012.

FIELD OF THE INVENTION

The present invention discloses a system and associated method for enhancing functionality of an existing software application without redesigning the existing software application, especially in a case of a procurement application.

BACKGROUND OF THE INVENTION

Conventional procurement applications are massive in scale and must operate with frequently updated data. Due to the nature of a procurement application, some attributes of data must be valid to justify an access to the procurement application. However, such crucial attributes may be developed only after the procurement application is designed and deployed. In such a case, the whole procurement application must be redesigned to support verification of the attribute. Redesigning a procurement application upon each emerging need for verifying a new attribute demands a lot of time and is very costly.

Thus, there is a need for a system and associated method that overcomes at least one of the preceding disadvantages of current methods and systems for verifying a new attribute in a procurement application.

SUMMARY OF THE INVENTION

The present invention provides a method for verifying a target attribute of a company profile record for a procurement application, wherein the procurement application supports a requisition transaction among at least two users who represent respective companies, the method comprising:

configuring a validity attribute of the company profile record to indicate whether the target attribute of the company profile record is valid, wherein the company profile record is stored in a database, wherein said configuring is performed by a company profile configuration module;

subsequent to said configuring, authenticating a user prior to logging in the user to the procurement application, wherein the user is represented by a user profile record stored in the database, wherein the user profile record comprises the target attribute with a valid instance for the target attribute, wherein the user profile record comprising an invalid instance for the target attribute is targeted to be removed from the database later by a user profile cleanup program, wherein said authenticating is performed by a user profile verification module; and subsequent to said authenticating, verifying a requisition object against the company profile record for a value of the target attribute of the requisition object that the user attempts to modify and subsequently prohibiting the user from modifying the requisition object determined to be invalid from said verifying, wherein the requisition object is represented by a requisition object record stored in the database, wherein the requisition object record comprises the target attribute and a validity flag, wherein said verifying is performed by a requisition object verification module.

The present invention provides a computer program product, comprising a computer usable storage medium having a computer readable program code embodied therein, said computer readable program code containing instructions that when executed by a processor of a computer system implement a method for verifying a target attribute of a company profile record for a procurement application, wherein the procurement application supports a requisition transaction among at least two users who represent respective companies, the method comprising:

configuring a validity attribute of the company profile record to indicate whether the target attribute of the company profile record is valid, wherein the company profile record is stored in a database, wherein said configuring is performed by a company profile configuration module;

subsequent to said configuring, authenticating a user prior to logging in the user to the procurement application, wherein the user is represented by a user profile record stored in the database, wherein the user profile record comprises the target attribute with a valid instance for the target attribute, wherein the user profile record comprising an invalid instance for the target attribute is targeted to be removed from the database later by a user profile cleanup program, wherein said authenticating is performed by a user profile verification module; and subsequent to said authenticating, verifying a requisition object against the company profile record for a value of the target attribute of the requisition object that the user attempts to modify and subsequently prohibiting the user from modifying the requisition object determined to be invalid from said verifying, wherein the requisition object is represented by a requisition object record stored in the database, wherein the requisition object record comprises the target attribute and a validity flag, wherein said verifying is performed by a requisition object verification module.

The present invention provides a computer system comprising a processor and a computer readable memory unit coupled to the processor, said memory unit containing instructions that when executed by the processor implement a method for verifying a target attribute of a company profile record for a procurement application, wherein the procurement application supports a requisition transaction among at least two users who represent respective companies, the method comprising:

configuring a validity attribute of the company profile record to indicate whether the target attribute of the company profile record is valid, wherein the company profile record is stored in a database, wherein said configuring is performed by a company profile configuration module;

subsequent to said configuring, authenticating a user prior to logging in the user to the procurement application, wherein the user is represented by a user profile record stored in the database, wherein the user profile record comprises the target attribute with a valid instance for the target attribute, wherein the user profile record comprising an invalid instance for the target attribute is targeted to be removed from the database later by a user profile cleanup program, wherein said authenticating is performed by a user profile verification module, and subsequent to said authenticating, verifying a requisition object against the company profile record for a value of the target attribute of the requisition object that the user attempts to modify and subsequently prohibiting the user from modifying the requisition object determined to be invalid from said verifying, wherein the requisition object is represented by a requisition object record stored in the database, wherein the requisition object record comprises the target attribute and a validity flag, wherein said verifying is performed by a requisition object verification module.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for verifying a target attribute of a company profile record for a procurement application, wherein the procurement application supports a requisition transaction among at least two users who represent respective companies, the method comprising:

configuring a validity attribute of the company profile record to indicate whether the target attribute of the company profile record is valid, wherein the company profile record is stored in a database, wherein said configuring is performed by a company profile configuration module;

subsequent to said configuring, authenticating a user prior to logging in the user to the procurement application, wherein the user is represented by a user profile record stored in the database, wherein the user profile record comprises the target attribute with a valid instance for the target attribute, wherein the user profile record comprising an invalid instance for the target attribute is targeted to be removed from the database later by a user profile cleanup program, wherein said authenticating is performed by a user profile verification module; and subsequent to said authenticating, verifying a requisition object against the company profile record for a value of the target attribute of the requisition object that the user attempts to modify and subsequently prohibiting the user from modifying the requisition object determined to be invalid from said verifying, wherein the requisition object is represented by a requisition object record stored in the database, wherein the requisition object record comprises the target attribute and a validity flag, wherein said verifying is performed by a requisition object verification module.

The present invention provides a method and system that overcomes at least one of the current disadvantages of conventional method and system for enhancing an existing procurement application with a verification of a record used in the procurement application.

BRIEF DESCRIPTION OF THE DRAWINGS

FIG. 6 illustrates an example of the user profile cleanup program of the company verification system in FIG. 2, in accordance with the embodiments of the present invention.

DETAILED DESCRIPTION OF THE INVENTION

The method of the present invention enhances a procurement application by verifying an attribute of a record that is desired to be valid in the procurement application.

The method of the present invention standardizes a software upgrade process for a procurement application to compensate for an obsolete company associated with user profile records, rather than redesigning the procurement application. The method of the present invention is applicable to any attribute of records that is desired to be valid in order to properly execute a procurement application.

Figure 1:
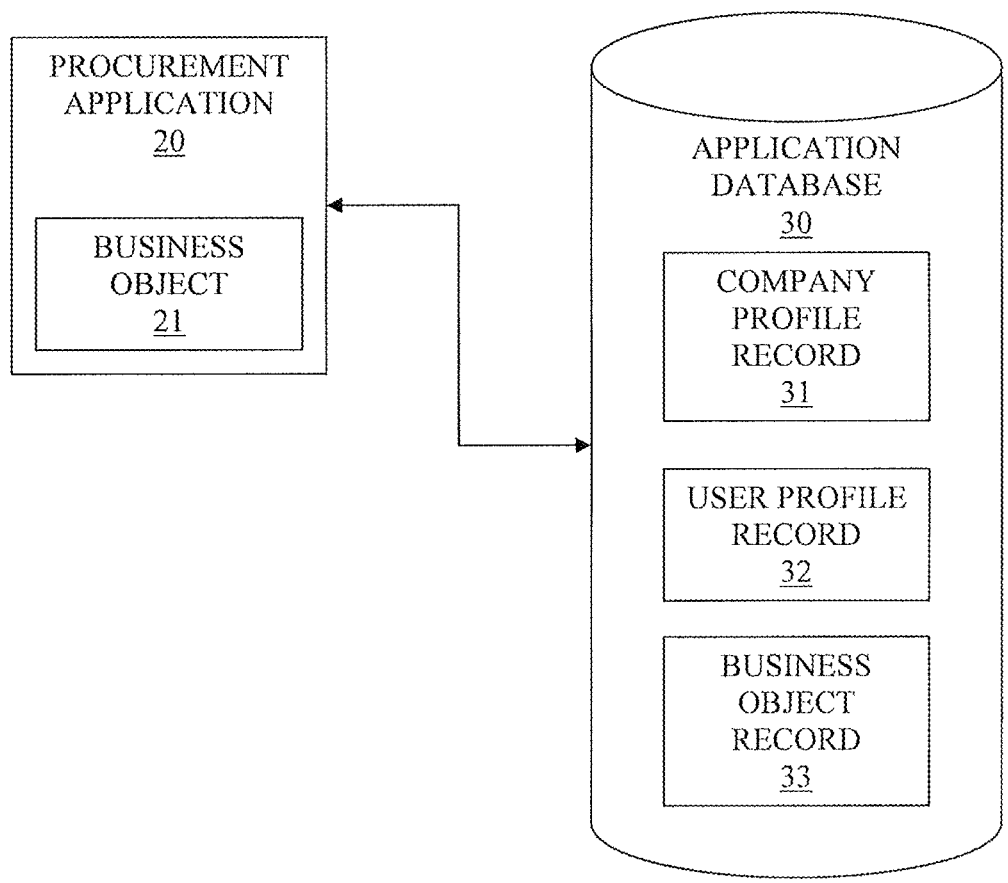
FIG. 1 illustrates a conventional procurement system comprising a procurement application and an application database.

FIG. 1 illustrates a conventional procurement system 10 comprising a procurement application 20 and an application database 30, wherein the application database 30 comprises company profile records 31, user profile records 32, and requisition object records 33.

The procurement application 20 is an electronic business solution providing purchase and/or sale of products and/or services through networking systems among participating parties. The procurement application 20 typically provides all transactional functionalities. Examples of transactions may be, inter alia, resource planning, maintenance, oversight, approval, accounting, etc. Examples of procurement applications may be, inter alia, the IBM Buy on Demand (BonD), Ariba®, the SAP Enterprise Resource Planning (SAP ERP), the SAP Supplier Relationship Management application (SAP SRM), etc.

The procurement application 20 comprises a business object 21 that represents a business transaction that takes place through the procurement application 20. The business object 21 has a company_code attribute to relate the business object to a company participating in the business transaction that is represented by the business object 21. The business object 21 is typically implemented as a class within the procurement application, and stored in the application database 30 as a business object record 33.

The company may be, inter alia, a customer, a product supplier, a service provider, etc. The procurement application 20 employs the application database 30 for records of the procurement application 20. Examples of the application database 30 may be, inter alia, a custom-designed procurement database, IBM DB2, Oracle®, MySQL®, etc.

Figure 2:
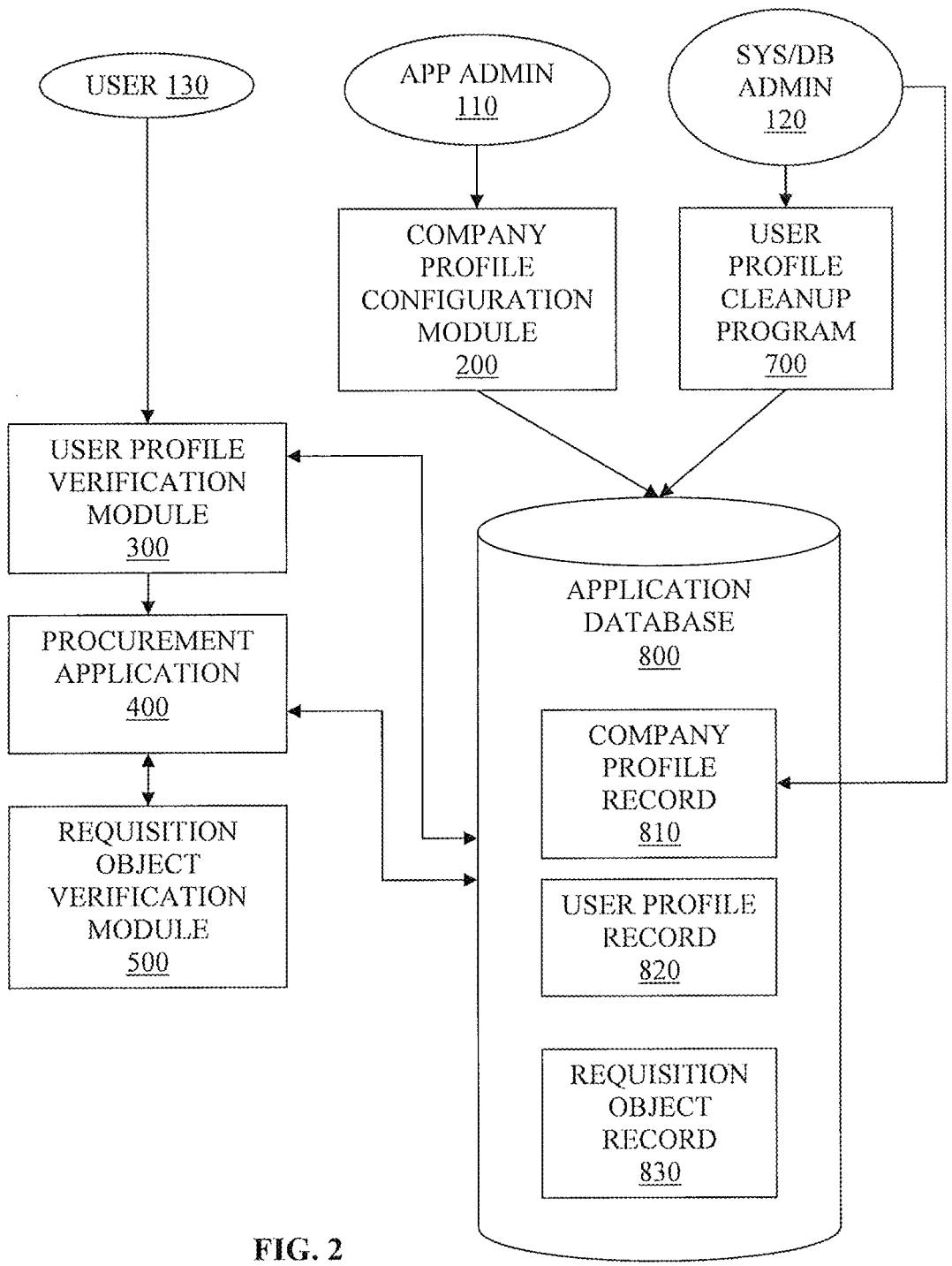
FIG. 2 illustrates a company verification system for verifying a company_code attribute for a procurement application, in accordance with embodiments of the present invention.

FIG. 2 illustrates a company verification system 100 for verifying a company_code attribute for a procurement application 400, in accordance with embodiments of the present invention.

The company verification system 100 comprises a company profile configuration module 200, a user verification module 300, the procurement application 400, a requisition verification module 500, a user profile cleanup program 700, and the application database 800. The application database 800 comprises a company profile record 810, a user profile record 820, and a requisition business object record 830. The company profile record 810 comprises a company_code attribute that is a target attribute to be verified, and a company_valid attribute that is a validity attribute that marks whether the target attribute is valid or not. The user profile record 820 comprises a company_code attribute that is a target attribute. The requisition object record 830 comprises a company_code attribute that is a target attribute and company_valid flag that marks whether the target attribute is valid or not.

The company_valid attribute is inserted into the company profile record 810 when the company_code attribute of the company profile record 810 is desired to be verified for the procurement application 400. The company_code attribute of the company profile record 810 is a target attribute that is desired to be verified. The company_valid attribute is a validity attribute that indicates whether the company profile record 810 has a legitimate and up-to-date instance for the company_code attribute of the company profile record 810.

An application administrator 110 configures the company profile record 810 through the company profile configuration module 200, after inserting the company_valid attribute into the company profile record 810. The company_valid attribute of the company profile record 810 has a binary value indicating that the company_code attribute of the company profile record 810 is either valid or invalid. The company_valid attribute of the company profile record 810 is initialized as valid upon creation.

When a user 130 attempts to log in to the procurement application 400, the user profile verification module 300 verifies the user profile record 820 of the user 130 against the company profile record 810. The user 130 with a valid instance for the company_code attribute of the user profile record 820 successfully logs in to the procurement application 400 and proceeds with creating a requisition object record 830 for a business transaction.

The requisition object record 830 represents a requisition transaction that the user 130 has created within the procurement application 400. The company_valid flag of the requisition object record 830 indicates whether the company_code attribute of the requisition object record 830 is instantiated with a valid value that is available in the company profile record 810 in the application database 800.

When the user 130 attempts to modify the requisition object record 830, a requisition object verification module 500 verifies the requisition object record 830 against the company profile record 810.

The database cleanup program 700 cleans up the user profile record 820 that has an invalid instance for the company_code attribute of the user profile record 820. The database cleanup program 700 may be performed with a command of a system and/or database administrator 120 or may be periodically performed by a scheduler of an operating system on which the application database 800 is implemented.

Figure 3:
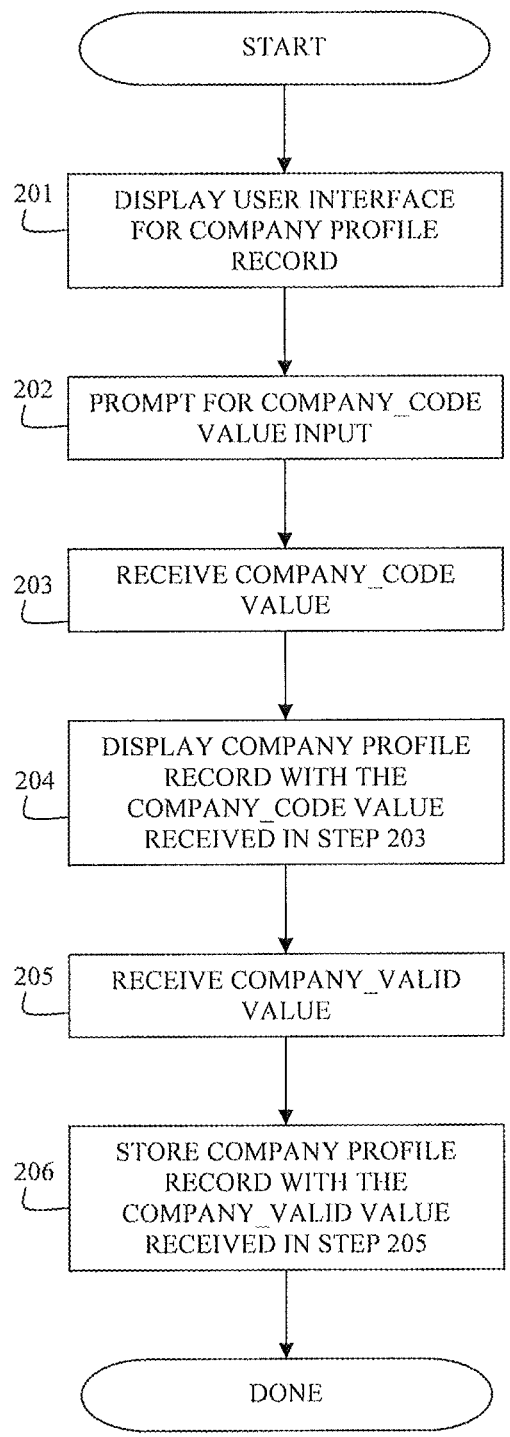
FIG. 3 is a flowchart depicting a method for the company profile configuration module of the company verification system in FIG. 2, in accordance with the embodiments of the present invention.

FIG. 3 is a flowchart depicting a method for the company profile configuration module 200 of the company verification system 100 in FIG. 2, in accordance with the embodiments of the present invention.

Initially, company profile records stored in the application database comprise the company_code attribute. The company_code attribute is a target attribute that is desired to be valid for the procurement application. Thus, a database administrator inserts a new attribute to mark the validity of the target attribute, which is the company_valid attribute, into the company profile record. The company_valid attribute is initially set as valid by the database administrator at the time when the company_valid attribute is created or by an application administrator after the company_valid attribute is created within the company profile records.

In step 201, the company profile configuration module displays a user interface for the application administrator to enable configuring company profile records that are stored in the application database. The user interface enables the application administrator to input values for company profile records.

In step 202, the company profile configuration module prompts the application administrator to input a value for the company_code attribute.

In step 203, the company profile configuration module receives the value for the company_code attribute from the application administrator.

In step 204, the company profile configuration module retrieves and displays content of a company profile record that has a same value for the company_code attribute to enable the application administrator to edit values for the company profile record.

In step 205, the company profile configuration module receives a validity value, which is valid or invalid, for the company_valid attribute from an input of the application administrator. The validity value is predefined as a pair of values indicating valid or invalid, as in YES/NO, 1/0, etc.

In step 206, the company profile configuration module stores the company profile record back to the application database with the validity value for the company_valid attribute received in step 205.

Figure 4:
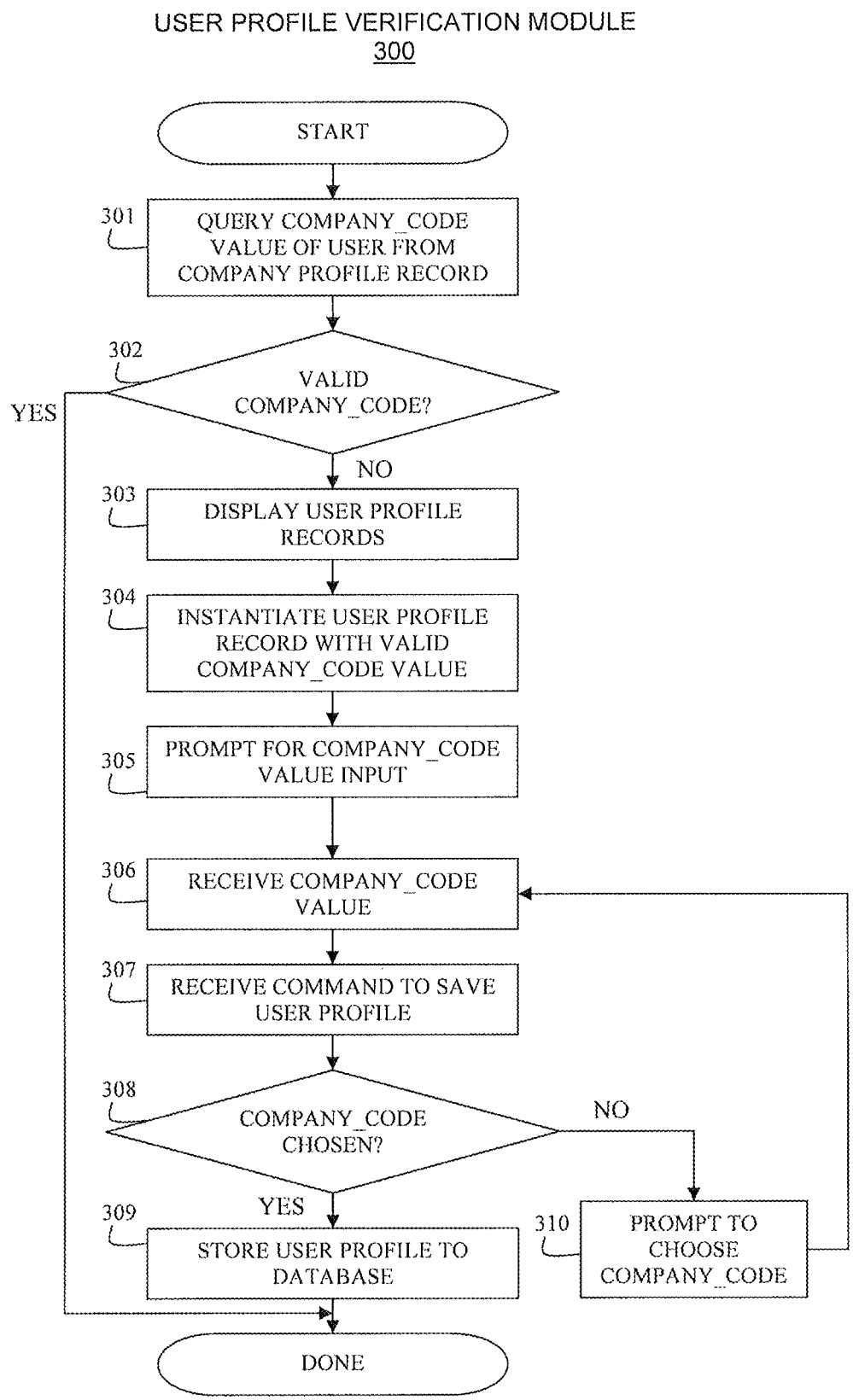
FIG. 4 is a flowchart depicting a method for the user profile verification module of the company verification system in FIG. 2, in accordance with the embodiments of the present invention.

FIG. 4 is a flowchart depicting a method for the user profile verification module 300 of the company verification system 100 in FIG. 2, in accordance with the embodiments of the present invention.

When a user profile record is created by a new user who is logging in to the procurement application, the user profile record comprises a same company_code attribute as is comprised by a company profile record, and the company_code attribute of the user profile record is assigned to a value in the company_code attribute of a company profile record in the application database.

In step 301, the user profile verification module queries the company profile record in the application database with a value for the company_code attribute in the user profile record of the user who attempts to log in to the procurement application.

In step 302, the user profile verification module determines whether the user profile record has a valid value for the company_code attribute. If the user profile verification module determines that the user profile record does not have a valid value for the company_code attribute, the user profile verification module proceeds with step 303. If the user profile verification module determines that the user profile record has a valid value for the company_code attribute, the user profile verification module terminates because the user profile record is suitable for the procurement application to use in business transactions involving the user represented by the user profile record.

In step 303, the user profile verification module displays the user profile record for the user with an invalid value for the company_code attribute.

In step 304, the user profile verification module instantiates the company_code attribute of the user profile record with a valid company_code values available in the company profile record. When multiple values are available for the company_code, the user profile verification module displays a list of available company_code values and prompts the user to select one for the user profile record out of the list of available company_code values.

In step 305, the user profile verification module prompts the user to input a company_code value for the company_code attribute of the user profile record.

In step 306, the user profile verification module receives a company_code value from the user for the company_code attribute.

In step 307, the user profile verification module receives "save user profile command" from the user.

In step 308, the user profile verification module determines whether a company_code attribute is selected by the user. If the user profile verification module determines that a company_code attribute is properly selected, the user profile verification module proceeds with step 309. If the user profile verification module determines that a company_code attribute is not properly selected, the user profile verification module proceeds with step 310.

In step 309, the user profile verification module stores the user profile to the user profile record of the application database.

In step 310, the user profile verification module informs the user to choose a valid company_code, and loops back to step 306.

Figure 5:
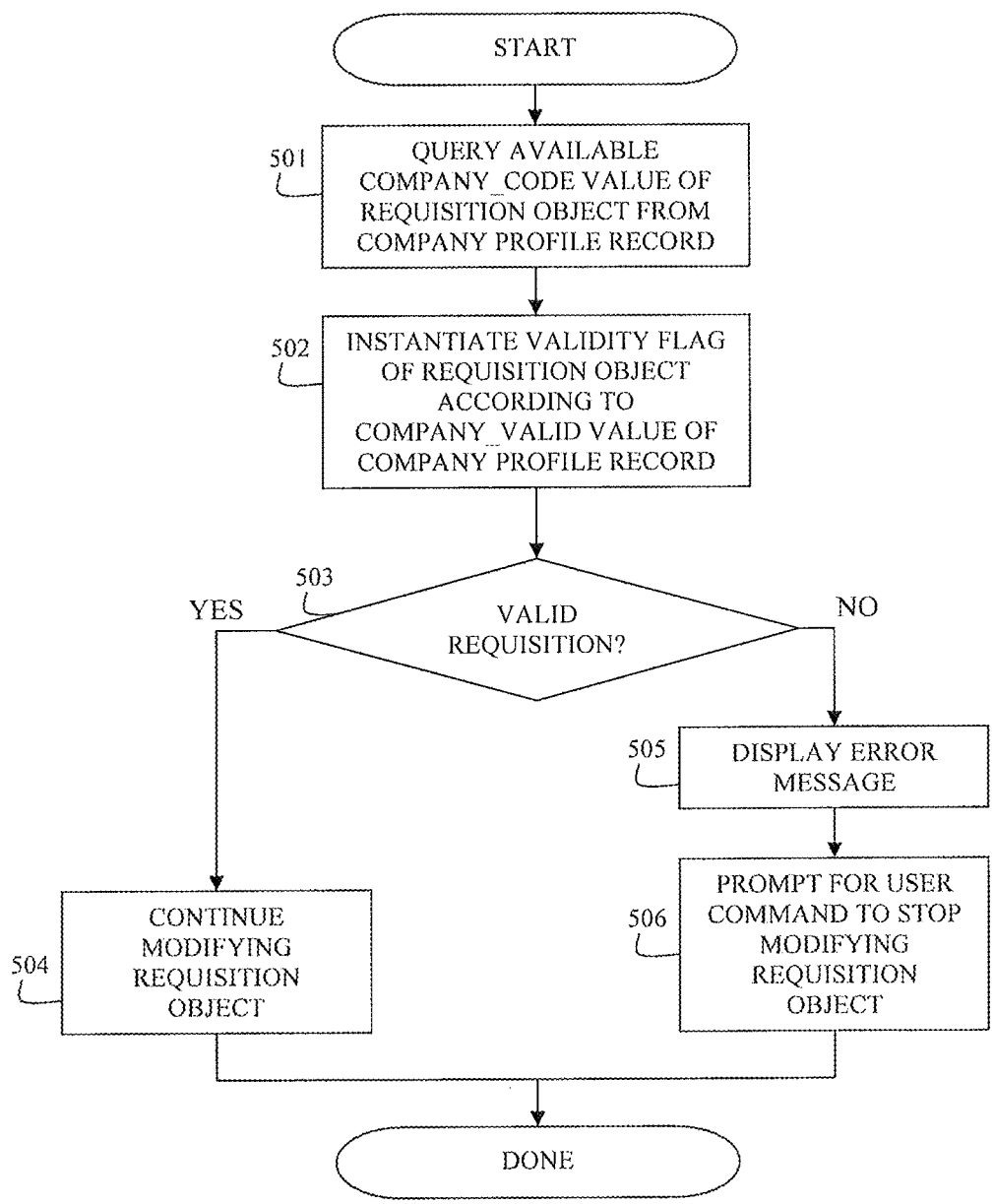
FIG. 5 is a flowchart depicting a method for the requisition object verification module of the company verification system in FIG. 2, in accordance with the embodiments of the present invention.

FIG. 5 is a flowchart depicting a method for the requisition object verification module 500 of the company verification system 100 in FIG. 2, in accordance with the embodiments of the present invention.

A requisition object is created by a user to represent a requisition that the user intends to perform. The requisition object inherits instances for common attributes from the user profile record that represents the user who creates the requisition object. Because only a user with valid company_code can create a requisition object, a value for the company_code attribute of the requisition object is initially valid.

The requisition object needs to be verified when the user attempts to modify the requisition object within the procurement application because, during the modification, the user may use an invalid value for a second company_code attribute representing a partner company in the transaction.

The validity flag of the requisition object marks the requisition object as valid or not. Thus, after the requisition object verification module is performed, it is guaranteed that the requisition object is valid within the procurement application.

In step 501, the requisition object verification module queries the company profile database record to identify all valid values for the company_code available for the requisition object.

In step 502, the requisition object verification module instantiates the validity flag of the requisition object with the company_valid attribute of the company profile record stored in the application database.

In step 503, the requisition object verification module determines whether the requisition object has a valid value for the company_code attribute as being indicated by a predefined valid value for the validity flag. If the requisition object verification module determines that the requisition object has a predefined valid value for the validity flag, the requisition object verification module proceeds to step 504. If the requisition object verification module determines that the requisition object has a predefined invalid value for the validity flag, the requisition object verification module proceeds to step 505.

In step 504, the requisition object verification module continues modifying the requisition object through a user interface because the requisition object verified as having a valid value for the company_code attribute.

In step 505, the requisition object verification module displays an error message to the user notifying that the requisition object has an invalid value for the company_code attribute and the requisition object cannot be modified.

In step 506, the requisition object verification module prompts for user command to stop modifying the requisition object.

FIG. 6 illustrates an example of the user profile cleanup program 700 of the company verification system 100 in FIG. 2, in accordance with the embodiments of the present invention.

The user profile cleanup program deletes user profile records that have an invalid value for the company_code attribute to ensure that a user without valid value for the company_code attribute in the user profile record is prohibited from logging in to the procurement application and from creating and/or modifying a requisition object. The user profile cleanup program is executed by a database administrator or by a scheduler of an operating system on which the user profile cleanup program is performed.

The user profile cleanup program checks the company profile record stored in the application database and identifies all invalid values for the company_code attribute. If the user profile cleanup program is able to identify any invalid value for the company_code attribute, the user profile cleanup program removes user profile records that have identified invalid values for the company_code attribute from the application database. If the user profile cleanup program cannot identify any invalid value for the company_code attribute, the user profile cleanup program terminates because all user profile records have valid values for the company_code attribute and proper for usage in the procurement application.

In this embodiment, the user profile cleanup program is a UNIX® shell script called "delete_invalid_profiles.sh" 710 that is executed by a command 750 invoking the UNIX® shell script "delete_invalid_profiles.sh" 710 provided on a system prompt with four arguments, wherein a first argument is "proc," a second argument is "temployee_profile," a third argument is "chrg_co_cd," and a fourth argument is "'ABC', 'DEF', 'GHI'."

In line 711, the user profile cleanup program sets a value of the first argument, "proc," provided in the command line command to "db_name" that indicates a name of the application database.

In line 712, the user profile cleanup program sets the second argument, "temployee_profile," provided in the command line command to "db_table" that indicates a name of the record in the "db_name" application database.

In line 713, the user profile cleanup program sets the third argument, "chrg_co_cd," provided in the command line command to "column_name" that indicates an attribute of the "db_table" record in the "db_name" application database.

In line 714, the user profile cleanup program sets the fourth argument, "'ABC', 'DEF', 'GHI'," provided in the command line command to "values" that indicates at least one value for the "column_name" attribute of the "db_table" record in the "db_name" application database.

In line 715, the user profile cleanup program deletes "db_table" records from "db_name" application database if a "db_table" record has a value from a group consisting of "values" for the "column_name" attribute of the "db_table" record. In this embodiment, the user profile cleanup program deletes any temployee_profile record from proc application database if chrg_co_cd column of temployee_profile record has a value 'ABC', 'DEF', or 'GHI.'

Figure 7:
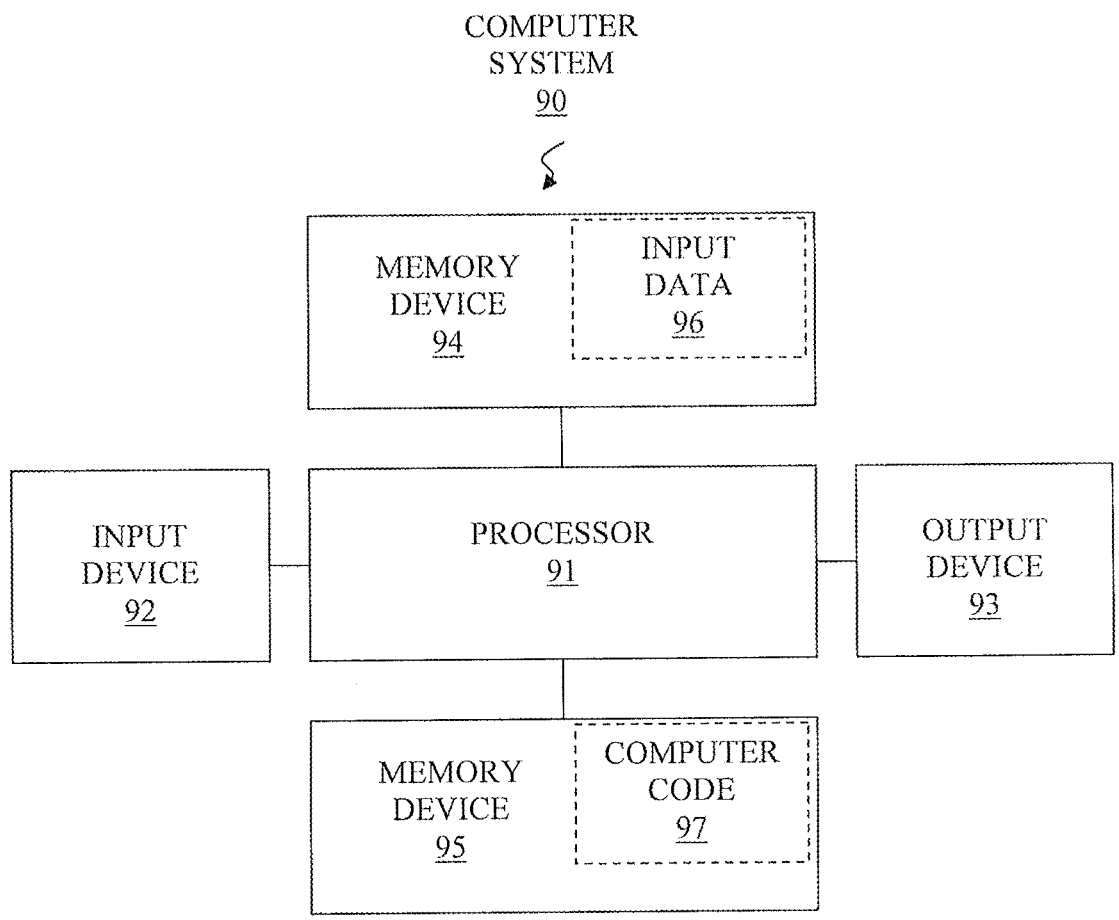
FIG. 7 illustrates a computer system used for verifying a company_code attribute for a procurement application, in accordance with embodiments of the present invention.

FIG. 7 illustrates a computer system 90 used for verifying a company_code attribute for a procurement application, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for verifying a company_code attribute for a procurement application according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for verifying a company_code attribute for a procurement application of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for verifying a company_code attribute for a procurement application In another embodiment, the invention provides a business method that performs the process steps of the invention on a subscription, advertising and/or fee basis. That is, a service provider, such as a Solution Integrator, can offer to create, maintain, support, etc. a process for verifying a company_code attribute for a procurement application of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, said method comprising:
ascertaining, by a processor of a computer system, that a database coupled to a software application stores a company profile record comprising a target attribute of the company profile record for the software application and a validity attribute associated with the target attribute of the company profile record, wherein the validity attribute has either a VALID value or an INVALID value respectively indicating that the target attribute in the company profile record has a valid value or an invalid value within the database;
insuring, by the processor, that the database stores a first user profile record and a second user profile record, that a first user of a requisition transaction corresponds to the first user profile record, that the first user profile record comprises a target attribute having a value identical to a value of a target attribute of a first company profile record associated with a first company represented by the first user;
verifying, by the processor, a requisition object record corresponding to the requisition transaction, wherein the requisition object record comprises the target attribute and a validity flag, wherein the validity flag of the requisition object record indicates whether or not the requisition object record is valid and usable in the requisition transaction, wherein the software application is configured to execute the requisition transaction using the requisition object record, wherein said verifying comprises:
querying the company profile record in the database for a first value for the target attribute of the requisition object record against valid target instances for the target attribute of the first company profile record;
setting the validity flag of the requisition object record with a value for the validity attribute of the first company profile record that is identical to the validity attribute of the first user profile record, wherein the value of the set validity flag is INVALID;
determining that the requisition object record is invalid responsive to said setting; and
displaying, responsive to said determining that the requisition object record is invalid, an error message that notifies the first user that the requisition object record is invalid and directs the first user to terminate modifying the requisition object record.

2. The method of claim 1,
wherein a first user initiates the requisition transaction only when the target attribute of the first company profile record is valid,
wherein the requisition object record had been created by the first user within the database by instantiating a value of the target attribute of the requisition object record with a corresponding value of the target attribute of the first user profile record from said insuring, and wherein the first user is enabled to modify the requisition transaction to involve a second user representing a second company only when the second user profile record has a valid target attribute.

3. The method of claim 1, wherein a target value of the target attribute of the company profile record and a validity value of the validity attribute of the company profile record are respectively configured by respective inputs from an administrator of the procurement application.

4. The method of claim 1, said ascertaining comprising:

displaying values of the company profile record via an output device of the computer system to an administrator of a procurement application;

receiving a target value of the target attribute of the company profile record from the administrator, wherein the target value of the target attribute identifies a company initiating the requisition transaction, and wherein the target attribute is named as company code;

re-displaying the values of the company profile record, wherein the values comprising the received target value;

receiving a validity value of the validity attribute associated with the received target value within the company profile record from the administrator; and saving to the database the company profile record comprising the target attribute set to the received target value and the validity attribute set to the received validity value.

5. The method of claim 1, said insuring comprising:

checking the database for a first value for the target attribute of the first user profile record against at least one valid target instance for the target attribute of the company profile record, wherein the validity attribute of the company profile record has a predefined valid value when the company profile record comprises a valid target instance from said at least one valid target instance for the target attribute;

determining that the first value from said checking for the target attribute of the first user profile record is invalid;

displaying, responsive to said determining, the first user profile records to the first user to enable the first user to choose a second value for the target attribute of the company profile record, wherein the second value is selected from said at least one valid target instance;

receiving the second value for the target attribute of the first user profile record from said displaying; and storing the first user profile record to the database with the received second value for the target attribute.

6. A computer program product, comprising: a computer readable hardware storage device having computer readable program code stored therein, said program code configured to be executed by a processor of a computer system to implement a method, said method comprising:

ascertaining that a database coupled to a software application stores a company profile record comprising a target attribute of the company profile record for the software application and a validity attribute associated with the target attribute of the company profile record, wherein the validity attribute has either a VALID value or an INVALID value respectively indicating that the target attribute in the company profile record has a valid value or an invalid value within the database;

insuring that the database stores a first user profile record and a second user profile record, that a first user of a requisition transaction corresponds to the first user profile record, that the first user profile record comprises a target attribute having a value identical to a value of a target attribute of a first company profile record associated with a first company represented by the first user;

verifying, by the processor, a requisition object record corresponding to the requisition transaction, wherein the requisition object record comprises the target attribute and a validity flag, wherein the validity flag of the requisition object record indicates whether or not the requisition object record is valid and usable in the requisition transaction, wherein the software application is configured to execute the requisition transaction using the requisition object record, wherein said verifying comprises:

querying the company profile record in the database for a first value for the target attribute of the requisition object record against valid target instances for the target attribute of the first company profile record;

setting the validity flag of the requisition object record with a value for the validity attribute of the first company profile record that is identical to the validity attribute of the first user profile record, wherein the value of the set validity flag is INVALID;

determining that the requisition object record is invalid responsive to said setting; and displaying, responsive to said determining that the requisition object record is invalid, an error message that notifies the first user that the requisition object record is invalid and directs the first user to terminate modifying the requisition object record.

7. The computer program product of claim 6, wherein a first user initiates the requisition transaction only when the target attribute of the first company profile record is valid, wherein the requisition object record had been created by the first user within the database by instantiating a value of the target attribute of the requisition object record with a corresponding value of the target attribute of the first user profile record from said insuring, and wherein the first user is enabled to modify the requisition transaction to involve a second user representing a second company only when the second user profile record has a valid target attribute.

8. The computer program product of claim 6, wherein a target value of the target attribute of the company profile record and a validity value of the validity attribute of the company profile record are respectively configured by respective inputs from an administrator of the procurement application.

9. The computer program product of claim 6, said ascertaining comprising:

displaying values of the company profile record via an output device of the computer system to an administrator of a procurement application;

receiving a target value of the target attribute of the company profile record from the administrator, wherein the target value of the target attribute identifies a company initiating the requisition transaction, and wherein the target attribute is named as company code;

re-displaying the values of the company profile record, wherein the values comprising the received target value;

receiving a validity value of the validity attribute associated with the received target value within the company profile record from the administrator; and saving to the database the company profile record comprising the target attribute set to the received target value and the validity attribute set to the received validity value.

10. The computer program product of claim 6, said insuring comprising:
checking the database for a first value for the target attribute of the first user profile record against at least one valid target instance for the target attribute of the company profile record, wherein the validity attribute of the company profile record has a predefined valid value when the company profile record comprises a valid target instance from said at least one valid target instance for the target attribute;
determining that the first value from said checking for the target attribute of the first user profile record is invalid;
displaying, responsive to said determining, the first user profile records to the first user to enable the first user to choose a second value for the target attribute of the company profile record, wherein the second value is selected from said at least one valid target instance;
receiving the second value for the target attribute of the first user profile record from said displaying; and
storing the first user profile record to the database with the received second value for the target attribute.

11. A computer system comprising: a processor, a memory coupled to the processor, and a computer readable storage device coupled to the processor, said storage device containing instructions configured to be executed by the processor via the memory to implement verification of a target attribute of a company profile record for a procurement application, said instructions comprising:
ascertaining that a database coupled to a software application stores a company profile record comprising a target attribute of the company profile record for the software application and a validity attribute associated with the target attribute of the company profile record, wherein the validity attribute has either a VALID value or an INVALID value respectively indicating that the target attribute in the company profile record has a valid value or an invalid value within the database;
insuring that the database stores a first user profile record and a second user profile record, that a first user of a requisition transaction corresponds to the first user profile record, that the first user profile record comprises a target attribute having a value identical to a value of a target attribute of a first company profile record associated with a first company represented by the first user;
verifying, by the processor, a requisition object record corresponding to the requisition transaction, wherein the requisition object record comprises the target attribute and a validity flag, wherein the validity flag of the requisition object record indicates whether or not the requisition object record is valid and usable in the requisition transaction, wherein the software application is configured to execute the requisition transaction using the requisition object record, wherein said verifying comprises:
querying the company profile record in the database for a first value for the target attribute of the requisition object record against valid target instances for the target attribute of the first company profile record;
setting the validity flag of the requisition object record with a value for the validity attribute of the first company profile record that is identical to the validity attribute of the first user profile record, wherein the value of the set validity flag is INVALID;
determining that the requisition object record is invalid responsive to said setting; and
displaying, responsive to said determining that the requisition object record is invalid, an error message that notifies the first user that the requisition object record is invalid and directs the first user to terminate modifying the requisition object record.

12. The computer system of claim 11,
wherein a first user initiates the requisition transaction only when the target attribute of the first company profile record is valid,
wherein the requisition object record had been created by the first user within the database by instantiating a value of the target attribute of the requisition object record with a corresponding value of the target attribute of the first user profile record from said insuring, and
wherein the first user is enabled to modify the requisition transaction to involve a second user representing a second company only when the second user profile record has a valid target attribute.

13. The computer system of claim 11, wherein a target value of the target attribute of the company profile record and a validity value of the validity attribute of the company profile record are respectively configured by respective inputs from an administrator of the procurement application.

14. The computer system of claim 11, said ascertaining comprising:
displaying values of the company profile record via an output device of the computer system to an administrator of a procurement application;
receiving a target value of the target attribute of the company profile record from the administrator, wherein the target value of the target attribute identifies a company initiating the requisition transaction, and wherein the target attribute is named as company code;
re-displaying the values of the company profile record, wherein the values comprising the received target value;
receiving a validity value of the validity attribute associated with the received target value within the company profile record from the administrator; and
saving to the database the company profile record comprising the target attribute set to the received target value and the validity attribute set to the received validity value.

15. The computer system of claim 11, said insuring comprising:
checking the database for a first value for the target attribute of the first user profile record against at least one valid target instance for the target attribute of the company profile record, wherein the validity attribute of the company profile record has a predefined valid value when the company profile record comprises a valid target instance from said at least one valid target instance for the target attribute;
determining that the first value from said checking for the target attribute of the first user profile record is invalid;
displaying, responsive to said determining, the first user profile records to the first user to enable the first user to choose a second value for the target attribute of the company profile record, wherein the second value is selected from said at least one valid target instance;
receiving the second value for the target attribute of the first user profile record from said displaying; and storing the first user profile record to the database with the received second value for the target attribute.

\* \* \* \* \*